(12) United States Patent
Espinosa et al.

(10) Patent No.: US 9,507,045 B2
(45) Date of Patent: Nov. 29, 2016

(54) BASALT FIBER COMPOSITE FOR ANTENNA IN WELL-LOGGING

(71) Applicant: Schlumberger Technology Corporation, Sugar Land, TX (US)

(72) Inventors: Frank Espinosa, Sugar Land, TX (US); Golchehreh Salamat, Sugar Land, TX (US); Alexander Marks, Houston, TX (US); Frederic Pauchet, Montigny-sur-Loing (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 143 days.

(21) Appl. No.: 14/109,242

(22) Filed: Dec. 17, 2013

(65) Prior Publication Data

US 2014/0176139 A1    Jun. 26, 2014

Related U.S. Application Data

(60) Provisional application No. 61/738,909, filed on Dec. 18, 2012.

(51) Int. Cl.
*G01V 3/26* (2006.01)
*G01V 13/00* (2006.01)
*G01V 3/12* (2006.01)
*G01V 3/18* (2006.01)
*E21B 47/10* (2012.01)

(52) U.S. Cl.
CPC ............. *G01V 3/26* (2013.01); *E21B 47/102* (2013.01); *G01V 3/12* (2013.01); *G01V 3/18* (2013.01); *G01V 13/00* (2013.01); *Y10T 29/49018* (2015.01)

(58) Field of Classification Search
None
See application file for complete search history.

(56) References Cited

U.S. PATENT DOCUMENTS

2005/0056419 A1* 3/2005 Hosie ............... E21B 33/0407
166/250.01
2007/0270237 A1* 11/2007 Tavares ............... A63B 53/04
473/349

(Continued)

FOREIGN PATENT DOCUMENTS

| EP | 1046065 B1 | 7/2008 |
|---|---|---|
| RU | 2231091 C1 | 6/2004 |
| RU | 2398112 C2 | 8/2010 |

OTHER PUBLICATIONS

Shorokhov, V.M., "Polimernye kompozity na osnove bazaltovoloknistykh materialov", Retrieved from the Internet: URL:https://web.archive.org/web/*/; http:www.polymery.ru/letter.php?n_id=1925&cat_id=3>, Retrieved on Mar. 11, 2014, 7 pages.

*Primary Examiner* — Patrick Assouad
*Assistant Examiner* — Douglas X Rodriguez
(74) *Attorney, Agent, or Firm* — Michael Dae

(57) ABSTRACT

A well-logging tool for a geological formation includes a housing to be positioned in a borehole and an antenna assembly carried by the housing. The antenna assembly includes an antenna housing having a recess therein. A dielectric material layer comprises a basalt fiber composite and is within the recess. At least one antenna coil is supported by the dielectric material layer. An electrical connector is coupled to the at least one antenna coil. Resistivity processing circuitry is coupled to the electrical connector to determine an electrical resistivity of the geological formation based on the at least one antenna coil.

20 Claims, 7 Drawing Sheets

(56) References Cited

U.S. PATENT DOCUMENTS

| | | | |
|---|---|---|---|
| 2008/0197954 A1 | 8/2008 | Groeppel et al. | |
| 2009/0167302 A1* | 7/2009 | Edwards | G01V 3/32 324/303 |
| 2009/0193742 A1* | 8/2009 | Wolf | E04F 13/147 52/311.1 |
| 2011/0028238 A1* | 2/2011 | Boyd | A63B 53/04 473/342 |
| 2011/0316542 A1* | 12/2011 | Frey | G01V 3/26 324/339 |
| 2013/0122763 A1* | 5/2013 | Fish | B32B 5/022 442/59 |
| 2013/0255966 A1* | 10/2013 | Palaghita | E21B 17/028 166/378 |
| 2014/0000910 A1* | 1/2014 | Palaghita | E21B 47/01 166/380 |
| 2014/0368198 A1* | 12/2014 | Espinosa | E21B 47/122 324/333 |

* cited by examiner

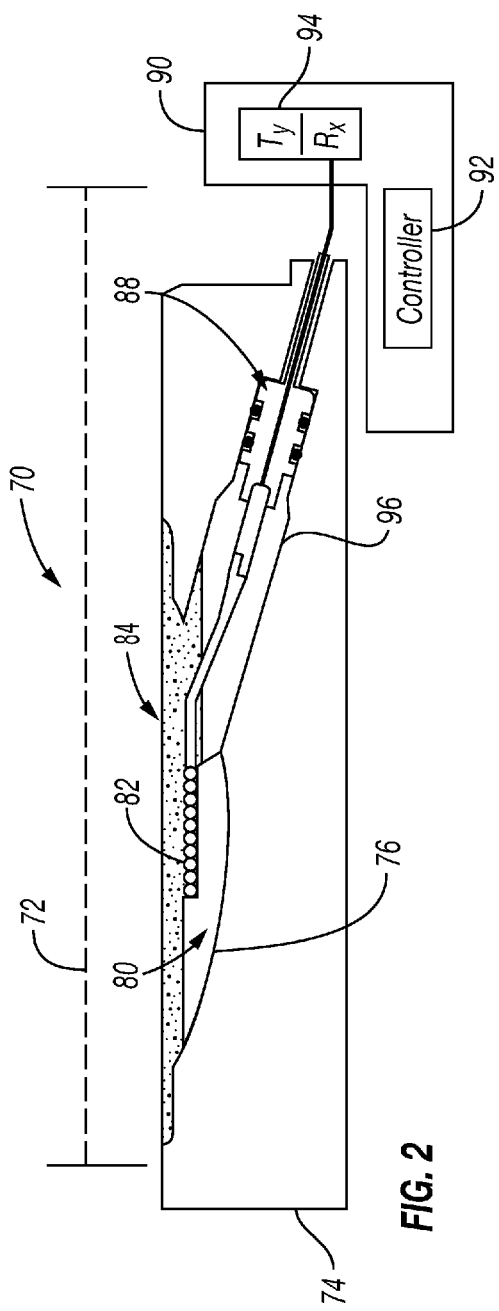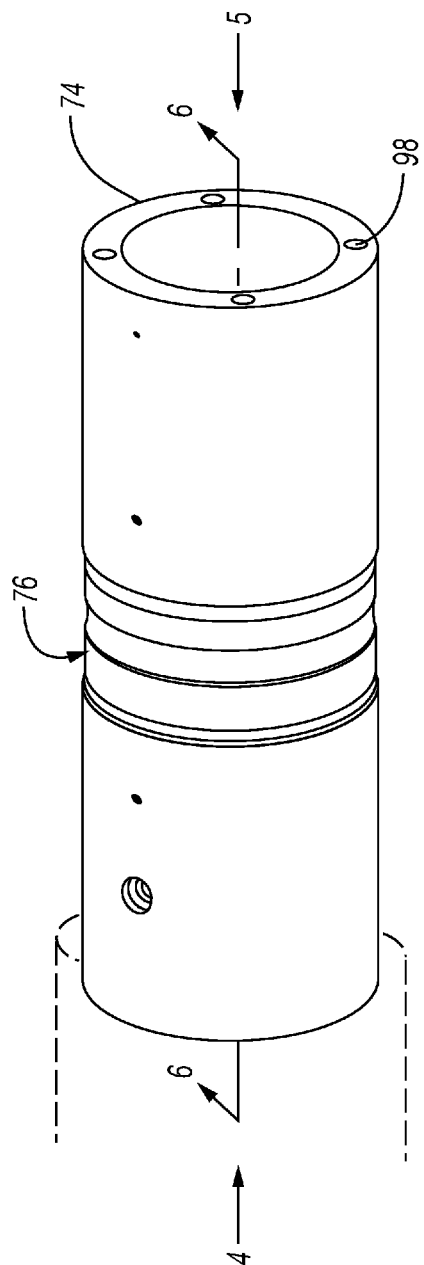
FIG. 2
FIG. 3

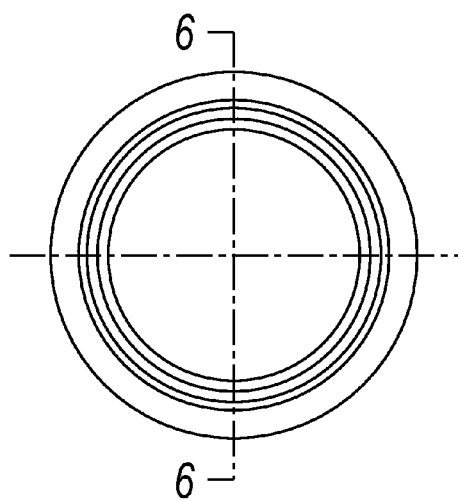
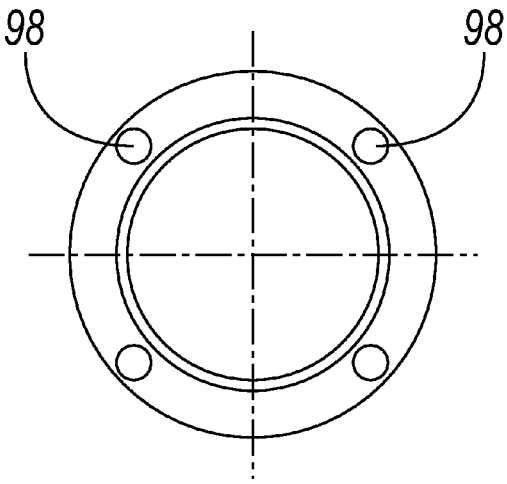
FIG. 4          FIG. 5
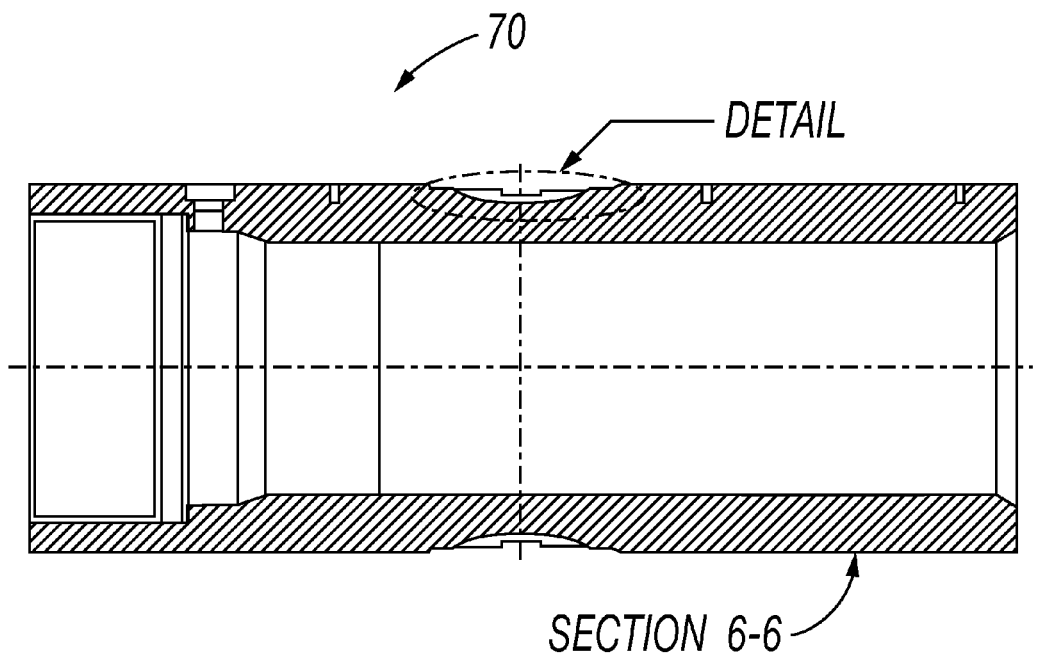
FIG. 6

ACTUAL PLOT OF PRESSURE, TEMPERATURE VERSUS TIME

PLOT OF SWELLING DIAMETER VERSUS ACCUMULATED AGING HOURS. COMPARES ALL COMPOSITE SAMPLES EXPOSED TO THE SAME CONDITIONS OF 205C.

BASALT FIBER COMPOSITE FOR ANTENNA IN WELL-LOGGING

CROSS-REFERENCE TO RELATED APPLICATIONS

This application claims benefit of U.S. Provisional Patent Application Ser. No. 61/738,909, filed Dec. 18, 2012, which is herein incorporated by reference.

BACKGROUND

Well-logging instruments are used in wellbores to make, for example, formation evaluation measurements and infer properties of the formation surrounding the borehole and the fluids in the formations. Such well-logging instruments may include resistivity logging tools that measure the resistivities of earth formations surrounding a borehole, such as in a hydrocarbon (e.g., oil, natural gas, etc.) well. One approach for performing resistivity measurements is by lowering a wireline-conveyed logging device into a wellbore after the wellbore is drilled.

Another approach is to make such measurements while the well is being drilled, which is referred to as logging-while-drilling (LWD) or measurement-while-drilling (MWD). The terms MWD and LWD are often used interchangeably, and the use of either term in this disclosure will be understood to include both the collection of a formation and wellbore information, as well as data on movement and placement of the drilling assembly. LWD or MWD techniques may allow corrective actions to be taken during the drilling processes if desired. For example, wellbore information if available in real time may be used to make adjustments to mud weights to prevent formation damage and to improve well stability. In addition, real time formation log data may be used to direct a drill bit to the desired direction (i.e., geosteering).

Generally speaking, there are two types of LWD tools for measuring formation resistivity, namely lateral tools and induction or propagation tools. Each of these tools relies on an electromagnetic (EM) measurement principle. A lateral tool may use one or more antennas or electrodes to inject low-frequency transverse magnetic fields into the formations to determine borehole and formation responses by measuring the current flow through the formations to the receivers. Lateral resistivity tools are generally responsive to azimuthal variations in formation resistivities around the borehole.

Propagation-type tools emit high-frequency electric fields into the formation to determine borehole and formation responses by measuring voltages induced in the receivers or by measuring difference responses between a pair of receivers or between the transmitter and the receiver. For example, for a propagation tool, incoming signal phases and amplitudes may be measured at each of several receivers with respect to the phases and amplitudes of the signals used to drive the transmitter. Induction-type transmitters generate magnetic fields that induce currents to flow in the formations. These currents generate secondary magnetic fields that are measured as induced voltages in receiver antennas disposed at a distance from the transmitter antenna.

Some resistivity logging tools include an antenna housing having a glass fiber/epoxy composite insulation coil bed that supports at least one antenna coil. Most of these antennas operate well below 150° C. Between 150° C. and 175° C., the antennas have been operated but they have a short lifetime. Beyond 175° C., the composites used to construct the insulation coil bed begin to fail mechanically. Any rubber bonding agent that adheres any rubber to the collar forming the antenna housing begins to fail, resulting in fluid leak into the antenna.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A well-logging tool for a geological formation includes a housing to be positioned in the borehole, and an antenna assembly carried by the housing. The antenna assembly includes an antenna housing having a recess therein. A dielectric material layer comprising a basalt fiber composite is within the recess. At least one antenna coil is supported by the dielectric material layer. An electrical connector is coupled to the at least one antenna coil. Resistivity processing circuitry is coupled to the electrical connector to determine an electrical resistivity of the geological formation based on the at least one antenna coil.

In one example, the electrical connector may be formed as an electrical feedthrough supported by the antenna housing. A feedthrough port is formed in the antenna housing and receives the electrical feedthrough. In another example, the basalt fiber composite is formed as a thermoset resin and basalt fibers mixed therewith. The thermoset material may be an epoxy resin. In another example, the thermoset resin includes a ceramic material, and in another example is formed as a thermoplastic material containing basalt fibers. In an example, the thermoplastic material is formed as a PEEK (polyether ether ketone).

BRIEF DESCRIPTION OF THE DRAWINGS

FIG. 2 is a schematic view of an antenna assembly that may be used with the well-logging tool and system of FIG. 1.

FIG. 3 is a perspective view of the cylindrical antenna housing showing its circumferential recess as used with the antenna assembly shown in FIG. 2.

FIG. 4 is an end view of the antenna housing of FIG. 3 looking in the direction of arrow 4.

FIG. 5 is an end view of the antenna housing of FIG. 3 looking in the direction of arrow 5.

FIG. 6 is a sectional view taken along line 6-6 of FIG. 3.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
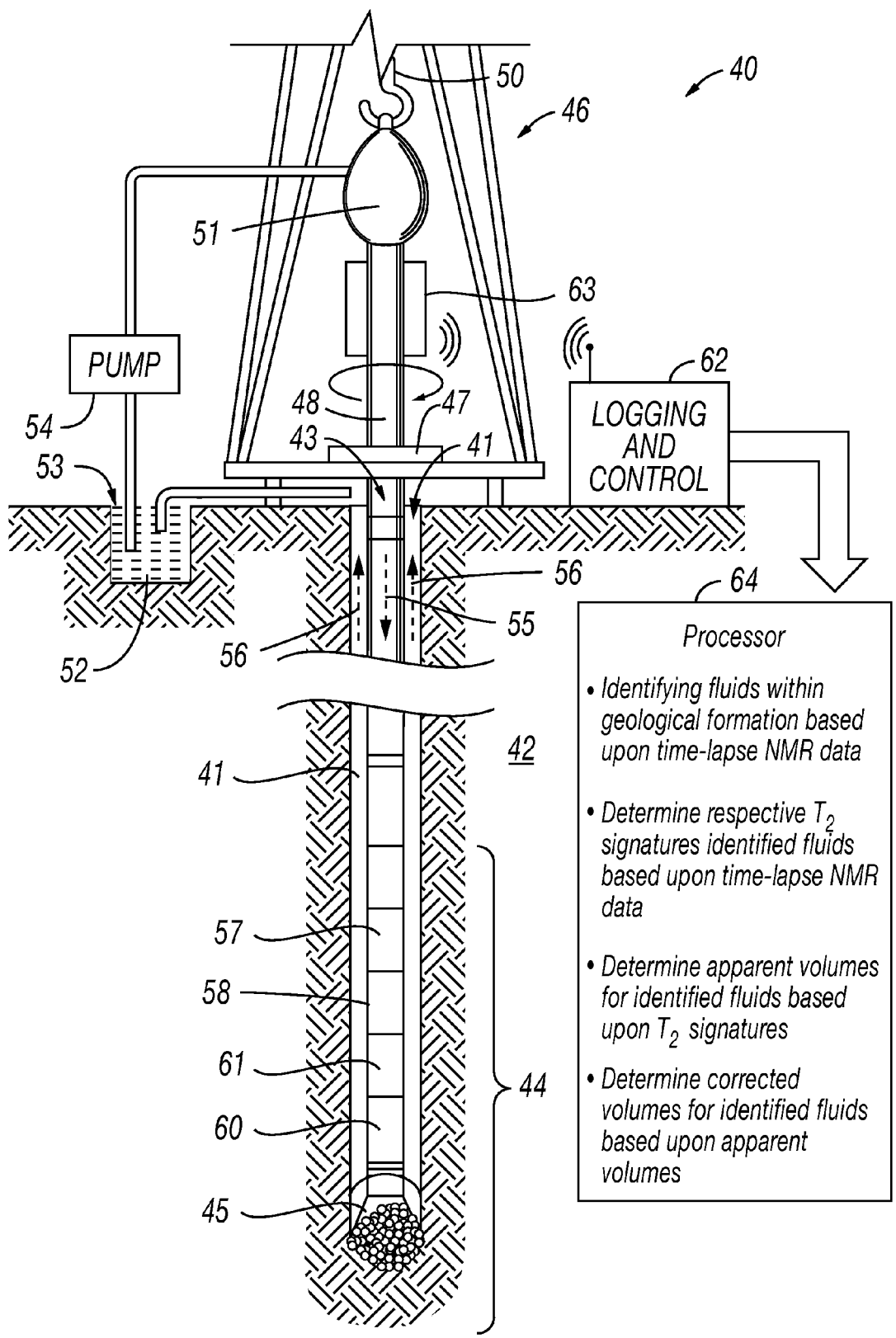
FIG. 1 is a schematic diagram illustrating a well-logging system in accordance with an example embodiment.

FIG. 1 illustrates a well site system 40 in which various embodiments may be implemented. In the illustrated example, the well site is a land-based site, but the techniques described herein may also be used with a water or offshore-based well site as well. In this example system, a borehole 41 is formed in a subsurface or geological formation 42 by rotary drilling, for example. Some embodiments may also use directional drilling, as will be described below.

A drill string 43 is suspended within the borehole 41 and has a bottom hole assembly ("BHA") 44 which illustratively includes a drill bit 45 at its lower end. The system 40 further illustratively includes a platform and derrick assembly 46 positioned over the borehole 41. The assembly 46 illustratively includes a rotary table 47, kelly 48, hook 50 and rotary swivel 51. The drill string 43 may be rotated by the rotary table 47 which engages the kelly 48 at the upper end of the drill string. The drill string 43 is illustratively suspended from the hook 50, which is attached to a traveling block (not shown), through the kelly 48 and the rotary swivel 51 which permits rotation of the drill string relative to the hook. A top drive system (not shown) may also be used to rotate and axially move the drill string 43, for example.

In the present example, the system 40 may further include drilling fluid or mud 52 stored in a pit 53 formed at the well site (or a tank) for such purpose. A pump 54 delivers the drilling fluid 52 to the interior of the drill string 43 via a port in the swivel 51, causing the drilling fluid to flow downwardly through the drill string as indicated by the directional arrow 55. The drilling fluid exits the drill string 43 via ports or nozzles (not shown) in the drill bit 45, and then circulates upwardly through an annular space ("annulus") between the outside of the drill string and the wall of the borehole, as indicated by the directional arrows 56. The drilling fluid lubricates the drill bit 45 and carries formation cuttings up to the surface as it is cleaned and returned to the pit 53 for recirculation.

The BHA 44 of the illustrated embodiment may include a logging-while-drilling ("LWD") module 57, a measuring-while-drilling ("MWD") module 58, a rotary steerable directional drilling system and motor 60, and the drill bit 45.

The LWD module 57 may be housed in a special type of drill collar, as is known in the art, and may include one or more types of well-logging instruments. It will also be understood that optional LWD and/or MWD modules 61 may also be used in some embodiments. (References, throughout, to a module at the position of 57 may mean a module at the position of 61 as well). The LWD module 57 may include capabilities for measuring, processing, and storing information, as well as for communicating the information with the surface equipment, e.g., to a logging and control unit 62, which may include a computer and/or other processors for decoding information transmitted from the MWD and LWD modules 57, 58 and recording and calculating parameters therefrom. The information provided by the MWD and LWD modules 57, 58 may be provided to a processor 34 (which may be off site, or in some embodiments may be on-site as part of the logging and control unit 62, etc.) for determining volumetric information regarding constituents within the geological formation 42, as will be discussed further below.

Referring now to FIGS. 2-7, there are illustrated figures of the antenna assembly illustrated generally at 70 that can be carried by a housing indicated by dashed lines that forms in one example a sensor housing 72, which can be part of the resistivity tool used in the well-logging tool explained with reference to FIG. 1. As illustrated in FIG. 3, the antenna assembly includes in this example a cylindrical antenna housing 74 formed from a metal material and forming a sub-collar as part of the antenna assembly. Hereinafter the cylindrical antenna housing can be referred to interchangeably as a collar. The antenna housing 74 includes a circumferential recess 76 that is machined in the peripheral surface as illustrated in FIG. 3. This recess is concave formed as best shown in the cross-section of FIG. 2 and the dielectric material layer 80, formed as a basalt fiber composite, fills the circumferential recess.

Figure 7:
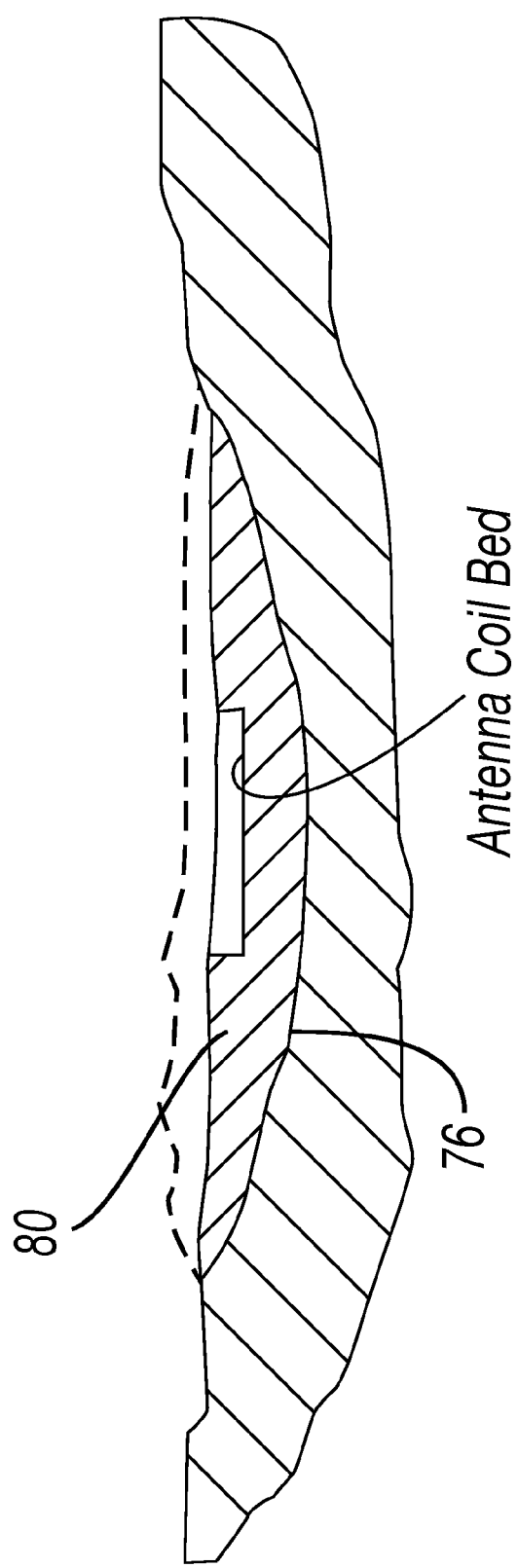
FIG. 7 is an enlarged sectional view of the antenna housing and showing in detail the circumferential recess.

As best shown in FIG. 2, the dielectric material layer 80 partially fills the recess 76 to a height almost to the outer surface of the cylindrical antenna housing and is machined with the configuration as shown in FIG. 3. At least one antenna coil 82 is supported by the dielectric material layer that forms a coil bed. In this example, the antenna coil 82 is supported by the dielectric material layer as a coil bed and not encapsulated, although in another example, the dielectric material could encapsulate the antenna coil. The dielectric material layer 80, formed as a basalt fiber composite, forms the coil bed as illustrated and shown in the cross-sectional view of FIG. 7. In the example of FIG. 2, an antenna cover 84 optionally covers over the dielectric material layer and antenna coil and can be formed from a rubber or other polymeric material. FIG. 7 shows an example view indicating the dielectric material forming the basalt fiber composite after machining and by dashed lines, and showing the height of the basalt fiber composite before machining.

As illustrated in FIG. 2, an electrical connector 88 is coupled to the at least one antenna coil 82 and formed as an electrical feedthrough supported by the antenna housing and connected to resistivity processing circuitry 90 which determines an electrical resistivity of the geological formation based upon the antenna coil. This resistivity processing circuitry 90 illustratively includes a controller 92 and a transmitter and/or receiver 94 coupled thereto. Multiple antenna assemblies may be spaced apart along the drill string illustrated in FIG. 1 to transmit and receive signals to and from the geological formation. As such, the controller 92 may interface with multiple transmitters and receivers for respective antenna assemblies. Transmitters and receivers may also be coupled to multiple antenna assemblies and shared with each other and a given antenna assembly may be used to alternate between transmitting and receiving in some embodiments.

In one example, the controller 92 may be carried on a drill string in the tool section behind the drill bit in an electronic chassis. The controller 92 may collect resistivity measurement data and store it for later retrieval such as when a drill string is removed from the borehole or it may communicate the resistivity measurement data up to a well-logging control center as the logging and control unit 62 shown in FIG. 1 outside of the well via telemetry or wire connection. The controller 92 may first process the measured values to make resistivity determinations or it may collect raw measurement data for later processing.

In the example shown in FIG. 2, the antenna housing has a feedthrough port 96 formed in the antenna housing and connecting the circumferential recess 76 and extends through the housing to receive the electrical feedthrough that connects to the resistivity processing circuitry.

FIG. 4 is an end view of the antenna housing looking in the direction of arrow 4 and FIG. 5 is an end view looking in the direction of arrow 5 of FIG. 3. FIG. 5 shows threaded receiving holes 98 to receive another collar or part and sensor body of a well-logging tool shown in FIG. 1. FIG. 6 shows details of the antenna housing. In an example, the feedthrough port 96 formed in the antenna housing shown in FIG. 2 is filled with epoxy.

Different epoxy base composites that include the basalt fiber have been tested as part of the antenna coil bed and subjected to high temperatures above 205° C. for extended periods of time in water or in drilling fluid. By analyzing the swelling, cracking and defamation in the coil bed, results consistently show that when the composite is made from basalt fiber, the composite does not deform, crack or swell. Stability of the coil bed made with basalt fiber when subject to downhole conditions is attractive for high temperature applications. The basalt fiber composite can be made using different techniques including wet preg, tow preg, pre-preg, casting, RTM and injection techniques. It can be cured using pressure or no pressure and under vacuum or no vacuum. Different curing temperatures and time profiles may be used. The fiber can include many different sizes and weave patterns and have different ratios of resin as the epoxy to basalt fiber. Different grades of basalt may be used as basalt is an extrusive igneous (volcanic) rock that has been formed by the rapid cooling of basaltic lava that is exposed at or near the surface of the planet or moon. It may include different portions of its composition as an aphanitic igneous rock with different amounts of quartz and feldspathoid by volume and feldspar in the form of plageioclase.

There now follows a description of testing of Petro Technical Services (PTS) as a high temperature soak basalt and a ceramic.

The test objective was to accumulate aging hours on a basalt fiber composite collar at 205° C. and 20,000 psi that may have similar properties as an antenna housing and formed as a cylinder such as in FIG. 3. The collar is not subject to a pressure difference and has no O-ring seals. Basic aging occurs for 100 or more hours. The tests were conducted in a Schlumberger pressure vessel facility following established safety rules. The following parameters were recorded: temperature (vessel); pressure (vessel); diameter of the composite before the test; and diameter of the composite after the test. As an acceptance criteria, the composite that forms the collar as equivalent to the cylindrical antenna housing was soaked in the test well fluid. The time at temperature is the criteria of 100+ hours.

Figure 8:
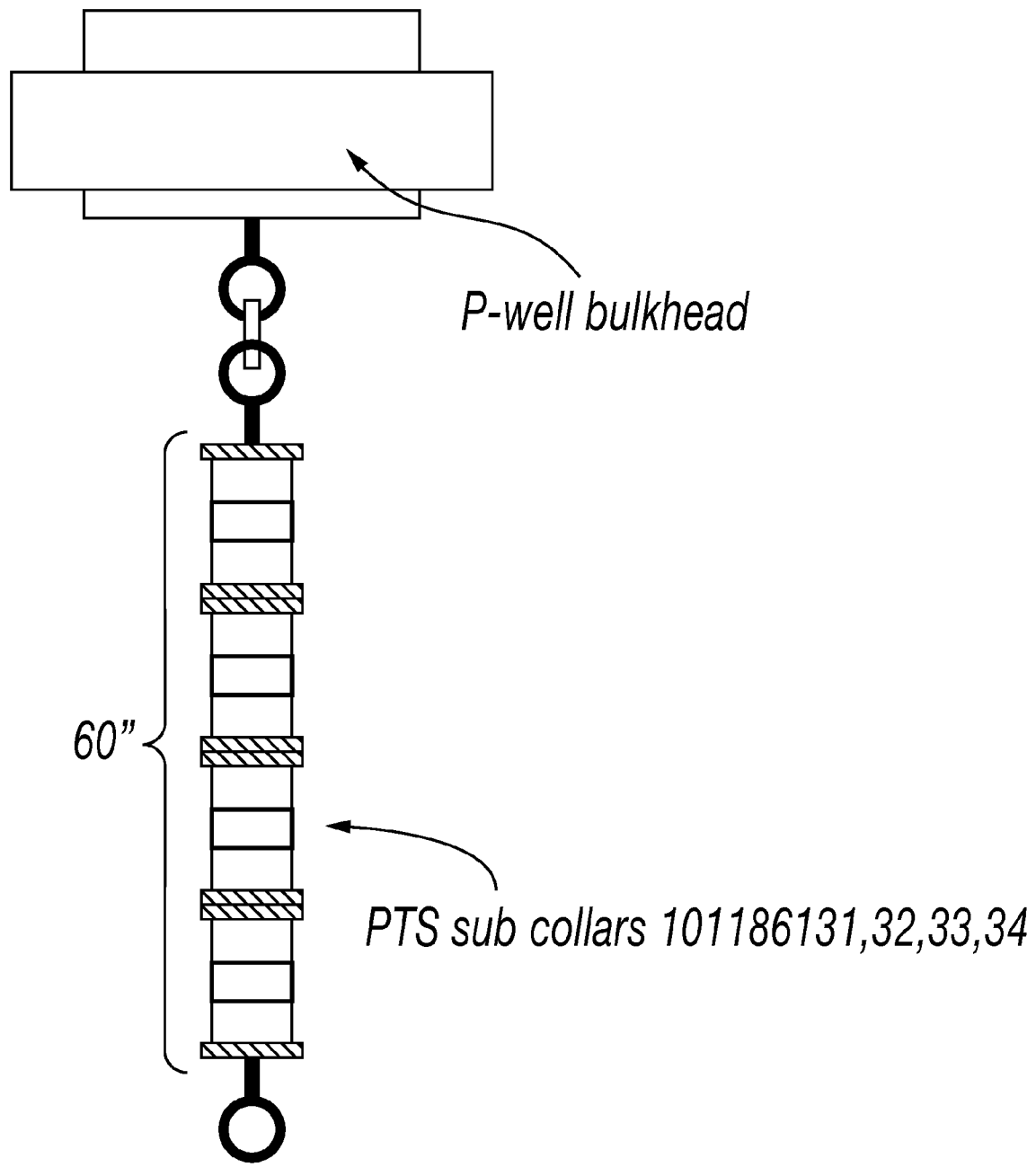
FIG. 8 is a schematic diagram of a set-up for testing the basalt fiber composite.

Tests were performed in a pressure well that accommodated the devices over test (DUT) as collars having a 6.9" diameter and a total assembly length of the collars as approximately 10 feet to handle 205° C. at 20,000 psi. The device under test (DUT) included various collars (also termed sub-collars) as: (a) 101185131 LTM16 composite; (2) 101185132 HTM60 composite; (3) 101186133 ceramic; and (4) 101186134 basalt. The overall length was about 5 feet. The test piece was hung in the well as shown in FIG. 8. The endcaps were not O-ring sealed so that there was no pressure differential across the steel sub-collar.

Figure 9:
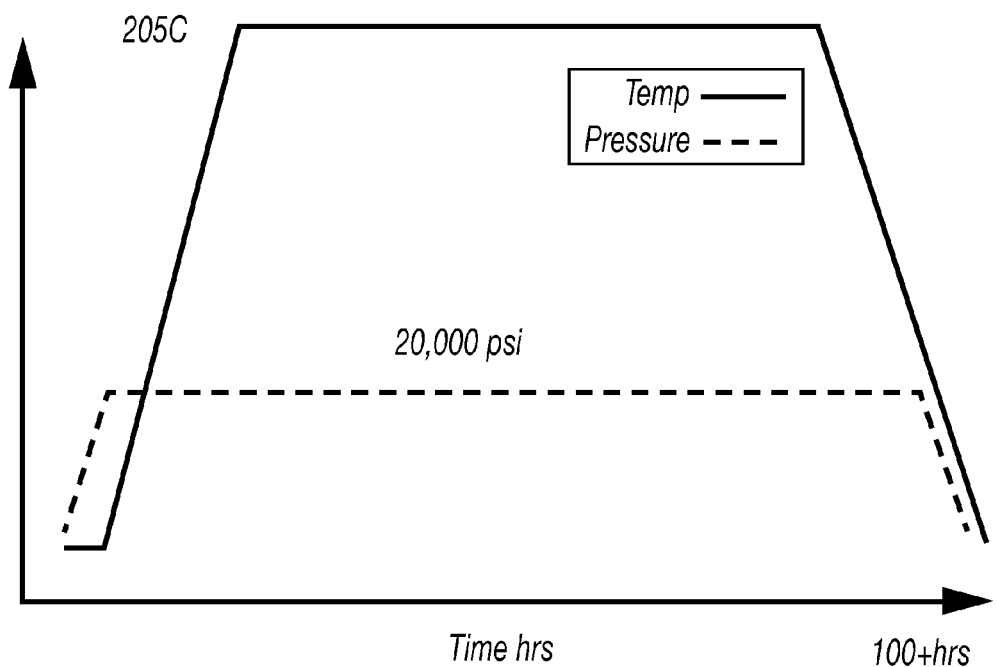
FIG. 9 is a graph of the pressure/temperature profile of the basalt fiber composite as shown in Table 1.

The pressure-temperature profile is described in detail in table 1 and contains the details that were followed. FIG. 9 is a schematic of the pressure/temperature plot of the experiment of about 200+ dwell time at the indicated temperature.

TABLE 1

PRESSURE-TEMPERATURE PROFILE

| Pressure (psi) | Temperature (C.) | Time (minutes) | Elapsed time, approx. (hrs) |
|---|---|---|---|
| Ambient | Ambient, 80 C. | Initial start | 0 |
| 20,000 | 205 | 100 minute ramp temperature, ~1-2 C./min, pressure increase 500 psi/min. | 1.5 |
| 20,000 | 205 | 200 hours, dwell+ | 101.5 or more if the well is available. Goal is 200 hours. |
| Done. | | Reduce pressure and temperature together. Depressurize at 500 psi/min, cool at .5 to 1 C./min. | 105 or more |

Figure 10:
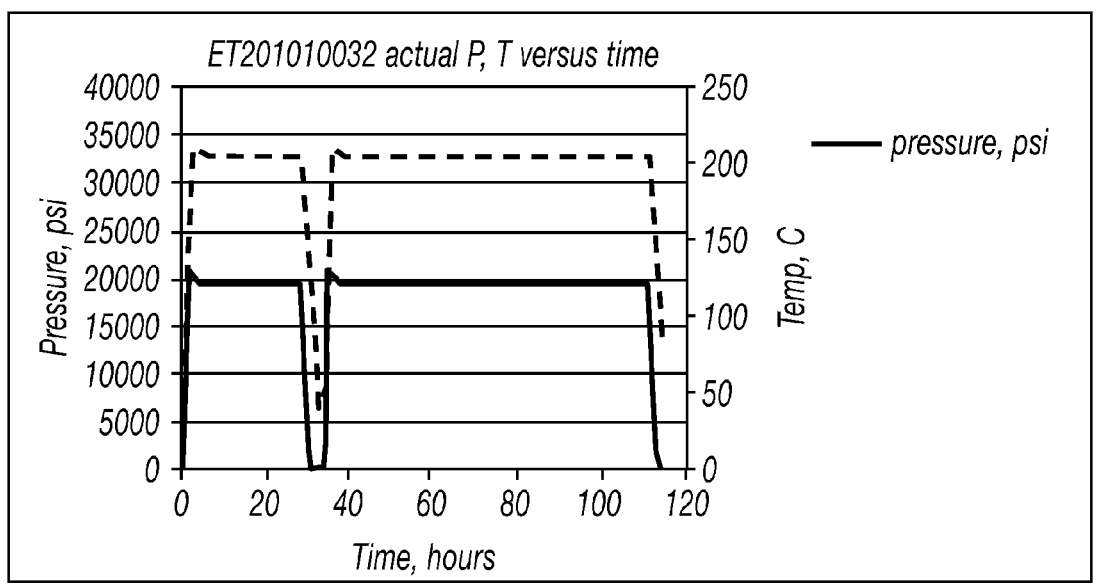
FIG. 10 is a graph showing the plot of the pressure and temperature versus time during testing.

FIG. 10 is an actual plot of pressure, temperature versus time and showing the results versus the objective. The ceramic and basalt samples continued to perform well as they did not exhibit any cracks. The diameter measurements are given below. The LTM and HTM were already cracked and not analyzed further.

Table 2 shows measured diameters of the basalt and ceramic samples with the post test diameters and Table 3 shows the swelling diameter versus the accumulating aging hours with the initial diameter and the change in diameter after 200 hours and the change in diameter after 300 hours for both the basalt and ceramic.

TABLE 2

MEASURED DIAMETERS OF THE BASALT AND CERAMIC SAMPLES

| Composite | Post test diameters, inches | | |
|---|---|---|---|
| D = 6.380" at t = 0 | Left | Middle | Right |
| Basalt | 6.384 | 6.388 | 6.384 |
| Ceramic | 6.395 | 6.406 | 6.396 |

TABLE 3

SWELLING DIAMETER VERSUS ACCUMULATED AGING HOURS

| Composite | Initial diameter, in. | ΔD, 200 hrs | ΔD, 300 hrs |
|---|---|---|---|
| Basalt | 6.380 | +0.008 | +0.008 (no change) |
| Ceramic | 6.380 | +0.026 | +0.026 (no change) |

Figure 11:
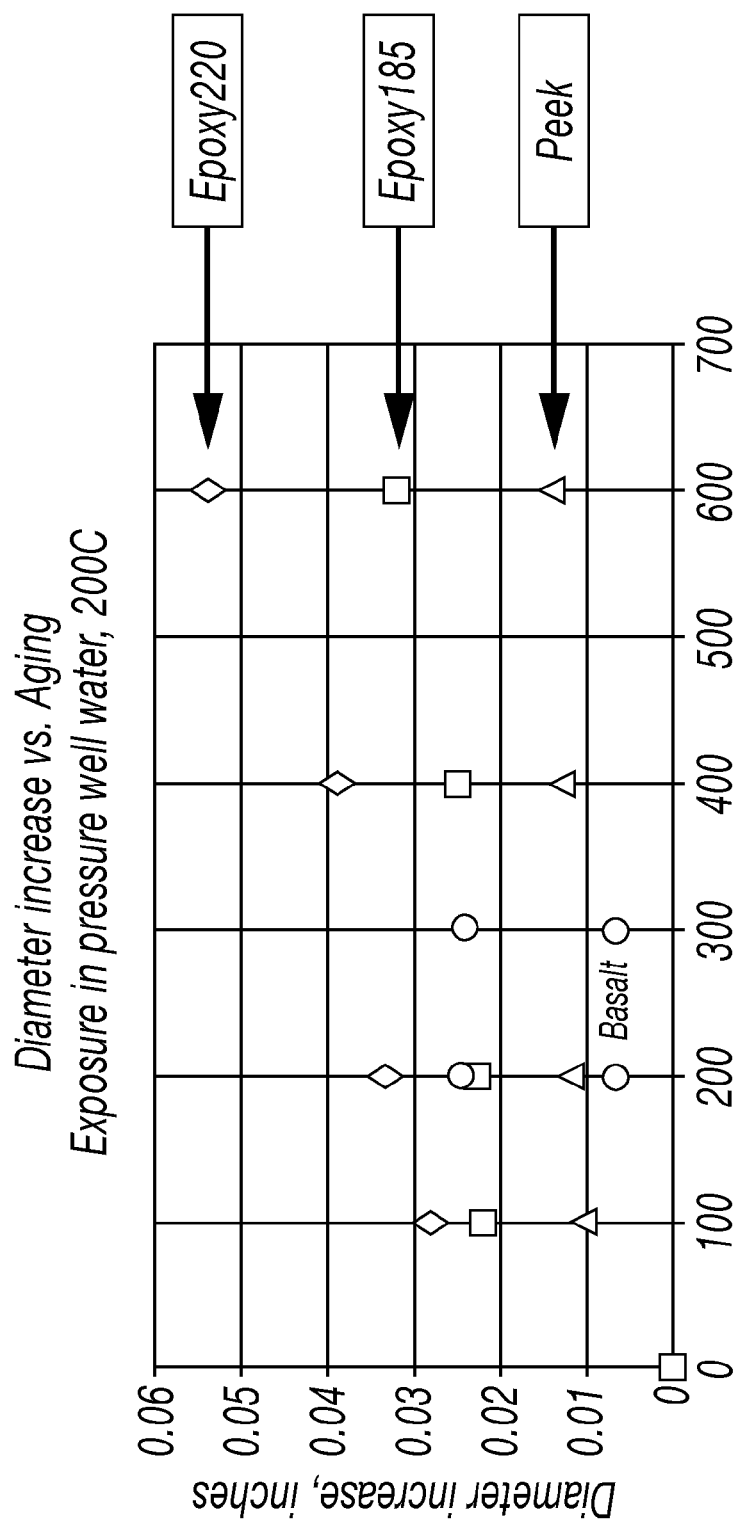
FIG. 11 is a graph showing the plot of the swelling diameter versus the accumulated aging hours for different composite samples exposed to the same conditions of 200° C.

FIG. 11 is a plot of swelling diameter versus accumulated aging hours. It compares all composite samples exposed to the same conditions of 205° C.

Based upon the results, it was determined that (1) the basalt and ceramic composites did not crack after 300 hours of exposure to water at 205° C.; and (2) the basalt and ceramic composites did not further swell from 200 to 300 hours.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A well-logging tool for a geological formation having a borehole therein, comprising:
 a housing to be positioned within the borehole;
 an antenna assembly carried by the housing and comprising
  an antenna housing having a recess therein,
  a dielectric material layer comprising a basalt fiber composite within the recess;
  at least one antenna coil supported by the dielectric material layer,
  an electrical connector coupled to the at least one antenna coil,
  wherein said dielectric material layer is configured to prevent fluid leakage to the antenna coil and/or electrical connector when the well-logging tool is operated at a downhole temperature higher than 175° C.; and
 resistivity processing circuitry coupled to the electrical connector to determine an electrical resistivity of the geological formation based upon the at least one antenna coil.

2. The well-logging tool according to claim 1, wherein said electrical connector comprises an electrical feedthrough supported by the antenna housing.

3. The well-logging tool according to claim 2, wherein said antenna housing has a feedthrough port formed therein receiving the electrical feedthrough.

4. The well-logging tool according to claim 1, wherein the basalt fiber composite comprises a thermoset resin and basalt fibers mixed therewith.

5. The well-logging tool according to claim 4, wherein said thermoset resin comprises an epoxy resin.

6. The well-logging tool according to claim 5, wherein said thermoset resin comprises a ceramic material.

7. The well-logging tool according to claim 1, wherein the basalt fiber composite comprises a thermoplastic material having basalt fibers mixed therewith.

8. The well-logging tool according to claim 7, wherein the thermoplastic material comprises PEEK (Polyether ether ketone).

9. An antenna for a well-logging tool, comprising:
 a housing;
 an antenna assembly carried by the housing and comprising
  an antenna housing having a recess therein,
  a dielectric material layer comprising a basalt fiber composite within the recess,
  at least one antenna coil supported by the dielectric material layer,
  an electrical connector coupled to the at least one antenna coil,
  wherein said dielectric material layer is configured to prevent fluid leakage to the antenna coil and/or electrical connector when the antenna is operated at a downhole temperature higher than 175° C.; and
 resistivity processing circuitry coupled to the electrical connector to determine an electrical resistivity of the geological formation based upon the at least one antenna coil.

10. The antenna according to claim 9, wherein said electrical connector comprises an electrical feedthrough supported by the antenna housing.

11. The antenna according to claim 9, wherein said antenna housing has a feedthrough port formed therein receiving the electrical feedthrough.

12. The antenna according to claim 9, wherein the basalt fiber composite comprises a thermoset resin and basalt fibers mixed therewith.

13. The antenna according to claim 12, wherein said thermoset resin comprises an epoxy resin.

14. A method for making a well-logging tool for a geological formation having a borehole therein, comprising:
 forming a housing to be positioned within the borehole;
 positioning an antenna assembly within the housing and comprising
  an antenna housing having a recess therein,
  a dielectric material layer comprising a basalt fiber composite within the recess,
  at least one antenna coil supported by the dielectric material layer,
  an electrical connector coupled to the at least one antenna coil,
  wherein said dielectric material layer is configured to prevent fluid leakage to the antenna coil and/or electrical connector when the well-logging tool is operated at a downhole temperature higher than 175° C.; and
 coupling resistivity processing circuitry to the electrical connector to determine an electrical resistivity of the geological formation based upon the at least one antenna coil.

15. The method according to claim 14, wherein the antenna housing has a feedthrough port formed therein receiving an electrical feedthrough.

16. The method according to claim 14, wherein the basalt fiber composite comprises a thermoset resin and basalt fibers mixed therewith.

17. The method according to claim 16, wherein the thermoset resin comprises an epoxy resin.

18. The method according to claim 17, wherein the thermoset resin comprises a ceramic material.

19. The method according to claim 14, wherein the basalt fiber composite comprises a thermoplastic material having basalt fibers mixed therewith.

20. The method according to claim 19, wherein the thermoplastic material comprises PEEK (Polyether ether ketone).

* * * * *